United States Patent Office 3,636,004
Patented Jan. 18, 1972

3,636,004
7-CYANO-COUMARINS
Klaus-Dieter Bode, Leverkusen, and Carl-Wolfgang Schellhammer, Opladen, Germany, assignors to Farbenfabriken Bayer Aktiengesellschaft, Leverkusen, Germany
No Drawing. Filed May 5, 1969, Ser. No. 821,970
Claims priority, application Germany, May 6, 1968,
P 17 68 364.6
Int. Cl. C07d 7/26
U.S. Cl. 260—308 R          2 Claims

ABSTRACT OF THE DISCLOSURE 7-cyano-coumarin of the formula

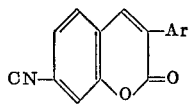

in which Ar denotes an optionally substituted aromatic carbocyclic or aromatic heterocyclic radical as defined hereinbelow which are adapted for use to protect organic materials against ultraviolet radiation.

---

The object of the present invention comprises 7-cyano-coumarins of the general formula

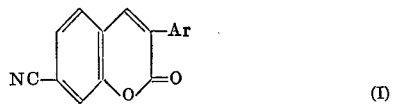

in which Ar denotes an optionally substituted aromatic-carbocyclic or aromatic-heterocyclic radical and the coumarin ring may contain further substituents, as well as their preparation and their use for the protection of organic materials against ultra-violet radiation.

Suitable aromatic radicals Ar are primarily phenyl or naphthalene radicals which may contain substituents such as alkyl groups with 1–4 carbon atoms, for example, methyl, ethyl, isopropyl or tert.-butyl groups; alkoxy groups with 1–4 carbon atoms, such as methoxy, ethoxy or isopropoxy groups; halogen atoms, such as chlorine or bromine; dialkylamino groups with 1–4 carbon atoms, such as dimethylamino or diethylamino groups; cyano groups; optionally substituted phenyl groups; or cycloalkyl groups, such as cyclohexyl groups.

Suitable aromatic-heterocyclic radicals Ar are, in particular, five- or six-membered radicals which contain nitrogen and may carry further substituents, such as pyrazolyl, imidazolyl, 1,2,3,-teriazolyl, 1,2,4-triazolyl, 1,2,3,4-tetrazolyl, thienyl, furyl, benzimidazolyl, benzoxazolyl, oxodiazolyl, triazinyl and pyridyl radicals; in the case of introgen containing heterocycles, the linkage with the coumarin ring may take place via carbon or nitrogen.

The preferred compounds are those in which Ar stands for an optionally substituted phenyl radical, imidazolyl, or 1,2,4-triazolyl radical. The preferred substituents in the phenyl radical are alkyl groups with 1–4 carbon atoms as well as alkoxy groups with 1–4 carbon atoms.

Examples of aromatic radicals Ar are: phenyl, tolyl, methoxyphenyl, ethoxyphenyl, dimethyl-aminophenyl, chlorophenyl, naphthyl, chloronaphthyl, dimethylphenyl, cyclohexyl-phenyl, cyanophenyl, biphenylyl.

The aromatic-heterocyclic radicals Ar primarily comprise pyrazolyl, imidazolyl, triazolyl, benzimidazolyl, benzoxazolyl, N-methyl-benzimidazolyl, 5-methyl-benzoxazolyl, thienyl, furyl, pyridyl.

The preparation of the coumarin compounds according to the invention can be carried out in known manner by diazotisation of 7-amino-coumarins of the general formula

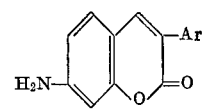

in which Ar has the same meaning as above, and subsequent reaction of the resultant diazonium salts with a heavy metal cyanide, preferably copper (I) cyanide in the presence of an alkali metal cyanide in an aqueous solution.

In detail, the reaction is carried out by suspending the amino-coumarin (II) at temperature between 0° and 30° C. in suitable acids such as sulphuric acid, hydrochloric acid or phosphoric acid, and diazotising at temperatures between 0° and 20° C. with 1.0 to 1.3 mol sodium nitrite or 1.0 to 1.3 mol nitrosyl-sulphuric acid per mol amino-coumarin. To remove the excess of acid, the diazonium salt concerned is turned out into water and filtered off with suction. The suspension of the diazonium salt is added dropwise at temperatures between 20° and 75° C. to a solution of 1–15 mol copper (I) cyanide and 1–15 mol potassium cyanide in water, the product is subsequently filtered off with suction and, after drying, recrystallised from suitable solvents such as dimethyl formamide, methyl glycol, glycol monomethyl ether acetate, isoamyl alcohol or ethanol.

The amino-coumarins (II) used as starting material can be prepared in the usual manner, for example, by condensation of 4-amino-salicylidene-aniline with suitable aryl- or hetero-aryl-acetic acids. Suitable arylacetic acids are phenylacetic acid, p-tolyl-acetic acid, 3,4-dimethyl-phenylacetic acid, p-methoxy-phenylacetic acid, p-ethoxy-phenylacetic acid, p-chloro-phenylacetic acid, p-dimethyl-amino-phenylacetic acid, p-cyano-phenylacetic acid, p-cyclohexyl-phenylacetic acid, naphthyl-acetic acid. The preparation of 7-amino-3-aryl-coumarins is described, for example, in Belgian patent specification No. 660,602, that of 7-amino-3-heteroaryl-coumarins in Belgian patent specification No. 681,962.

Suitable heteroaryl-acetic acids are 2-thienyl-acetic acid, pyrazolyl-(1)-acetic acid, 1,2,4-triazolyl-(1)-acetic acid, 1,2,3-triazolyl-(1)-acetic acid, 2-furylacetic acid, 2-pyridyl-acetic acid, benzoxazolyl-(2)-acetic acid, 5-methyl-benzoxazolyl-(2)-acetic acid, benzimidazolyl-(2)-acetic acid, N-methyl-benzimidazolyl-(2)-acetic acid.

The new compounds (I) are valuable agents for protecting organic materials from light. They can be produced in good yields and are characterised by their outstanding stability to light in polymeric carrier materials. Suitable carrier materials are organic polymers, fully synthetic polymers as well as natural polymers and their polymer homologous, chemical modification products. In particular, the following polymeric materials are suitable: homopolymers and copolymers from vinyl and vinylidene monomers, such as polyvinyl chloride, polyvinyl fluoride and polyvinylidene chloride; polystyrene, polyisobutylene, polyethylene and polypropylene; polyacrylic acid, polymethacrylic acid, polyacrylonitrile, polyacrylic and polymethacrylic acid esters and amides; acylated derivatives of polyvinyl alcohol, and polyvinylamine, for example, polyvinyl acetate; furthermore, homo- and copolymers of epoxides, lactams and aldehydes, especially formaldehyde and acetaldehyde; polyurethanes, and polyureas.

The 7-cyano-3-aryl-coumarins of the Formula I are incorporated with the light-sensitive carriers in amounts of, preferably, 0.01 to 20%. The amount of 7-cyano-3-aryl-coumarins to be incorporated depends, inter alia, on the thickness of the light filters to be produced. For thin layers, amounts of 1 to 10% are preferred.

The 7-cyano-3-aryl-coumarins of the Formula I are also valuable intermediates for the production of optical brightening agents.

The degrees given in the examples are degrees centigrade.

EXAMPLE 1

(1) Production of 7-cyano-3-phenyl-coumarin 223 g. 7-amino-3-phenyl-coumarin are introduced at room temperature into 2000 g. of 80% sulphuric acid. The suspension is stirred for 4 hours and diazotised at 15° with 312 g. nitrosyl-sulphuric acid. Stirring is continued for 3 hours, and the suspension is then poured on to 4 kg. of ice and 4 litres of water. The diazonium salt is filtered off with suction and washed with a saturated sodium chloride solution. The crystalline diazonium salt is suspended in 2 litres of water and added dropwise at 70° to a solution of 200 g. copper (I) cyanide and 500 g. potassium cyanide in 3 litres of water. The mixture is heated at 90–95° for 30 minutes and filtered off with suction. After recrystallisation from glycol monomethyl ether acetate/active charcoal, there are obtained 178 g. of almost colourless needles of melting point 284°.

(2) Use (a) A mixture of 600 g. of powdered emulsion polyvinyl chloride, 330 g. dioctyl phthalate and 10 g. 7-cyano-3-phenyl-coumarin is worked into foils in a two-roll mill at 150°. Compared with untreated foils, these foils exhibit brownish discolourations only after twice the illumination time.

(b) 100 g. of polycaprolactam granulate and 1 g. 7-cyano-3-phenyl-coumarin are melted in a spinning autoclave at 220° with the exclusion of air and pressed through a bottom nozzle by means of nitrogen. The resultant homogeneous mass absorbs light and can be used for the production of packing material which is protected against ultra-violet radiation. A UV-protected material is also obtained with the use of poly-hexamethylene-adipamide.

(c) A polystyrene granulate is mixed dry with 0.5% 7-cyano-3-phenyl-coumarin and 0.15% tri-tert.-butylphenol, and then moulded in an injection moulding machine to form plates of 2 mm. thickness. When the plates are illuminated with the Fade-Ometer for 200 hours, they show virtually no yellowing, whereas the unprotected plates are noticeably yellow.

Similar results are achieved with the following 7-cyano-3-aryl-coumarins prepared in the manner described in Example 1:

7-cyano-3-p-tolyl-coumarin (melting point 285–286.5°)
7-cyano-3-p-methoxyphenylcoumarin (melting point 268°)
7-cyano-3-pyrazolyl-(1)-coumarin (melting point 237°)
7-cyano-3-[1,2,4-triazolyl-(1)]-coumarin (melting point 262°)

We claim:
1. A compound of the formula

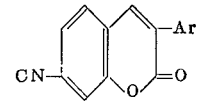

in which Ar denotes a radical selected from the group consisting of phenyl or naphthyl or substituted phenyl or substituted naphthyl wherein said substituents are selected from the group consisting of alkyl with 1–4 carbon atoms, alkoxy with 1–4 carbon atoms, halogen, dialkyl amino with 1–4 carbon atoms, cyano, phenyl and cyclohexyl, or said member Ar is an aromatic heterocyclic radical selected from the group consisting of pyrazolyl, imidazolyl, 1,2,3-triazolyl, 1,2,4-triazolyl, 1,2,3,4-tetrazolyl, thienyl, furyl, benzimidazolyl, benzoxazolyl, oxodiazolyl, triazinyl, and pyridyl radicals, said heterocyclic member being linked to the coumarin ring either through a carbon or nitrogen atom.

2. The compound of claim 1 wherein Ar is selected from the members phenyl, substituted phenyl, imidazolyl, and 1,2,4-triazolyl.

References Cited

UNITED STATES PATENTS 3,356,689  12/1967  Haeberli _____ 260—343.2

OTHER REFERENCES

Fieser et al., "Advanced Organic Chemistry," Reinhold Publ. Corp., New York (1961), p. 729.
Crawford et al., J. Chem. Soc., 1956, pp. 2155–60.

JOHN M. FORD, Primary Examiner

U.S. Cl. X.R.

260—343.2 R, 310 R, 309, 308 A, 308 D, 309.2, 307 D, 307 G, 248 R, 332.2 H, 141, 295 F, 45.8 R; 252—407, 300; 117—33.3